United States Patent [19]

Wapler et al.

[11] Patent Number: 4,999,137
[45] Date of Patent: Mar. 12, 1991

[54] SEMI-CONDUCTIVE CERAMIC COMPOSITION AND ITS USE IN THE MANUFACTURE OF SPARK PLUGS

[75] Inventors: Simone Wapler, Neuilly/Seine; Patrick Balland, Rueil Malmaison, both of France

[73] Assignee: Eyquem, Cedex, France

[21] Appl. No.: 432,879

[22] Filed: Nov. 7, 1989

[30] Foreign Application Priority Data

Nov. 21, 1988 [FR] France .................... 88 15117

[51] Int. Cl.$^5$ .................... C04B 35/52; H01B 1/04
[52] U.S. Cl. .................... 252/516; 501/87; 501/89; 501/134
[58] Field of Search ............ 501/87, 89, 134; 252/516

[56] References Cited

U.S. PATENT DOCUMENTS

| | | | |
|---|---|---|---|
| 3,088,921 | 5/1963 | Heischmann | 252/516 |
| 3,291,759 | 12/1963 | Pitha | 252/516 |
| 3,376,367 | 4/1968 | Subramanya et al. | 264/57 |
| 3,558,959 | 1/1971 | Ziemendorg | 313/130 |
| 3,573,231 | 3/1971 | Subramanya et al. | 252/516 |
| 4,120,829 | 10/1978 | Dulin | 252/516 |

FOREIGN PATENT DOCUMENTS 2136874A 9/1984 United Kingdom .

Primary Examiner—William R. Dixon, Jr.
Assistant Examiner—Deborah Jones
Attorney, Agent, or Firm—Wenderoth, Lind & Ponack

[57] ABSTRACT

The semi-conductive ceramic composition is obtained according to the invention from (a) a basic composition containing 40 to 80% by weight of a semi-conductor which is a silicon or boron carbide, 5 to 40% by weight of a binder or of a mixture of binders chosen from aluminum oxide, beryllium oxide, zirconium oxide, magnesium oxide, silica and silicon nitride, and 0 to 40% of a flux of a mixture of fluxes chosen from alkaline-earth carbonates and oxides, rare earth oxides and metal silicates, and (b) 5 to 40% by weight, relative to the basic composition (a), of a heat-emitting dope chosen from titanium, barium titanate, tungsten and lanthanum boride.

7 Claims, No Drawings

SEMI-CONDUCTIVE CERAMIC COMPOSITION AND ITS USE IN THE MANUFACTURE OF SPARK PLUGS

The present invention relates to a semi-conductive ceramic composition and its use in the manufacture of spark plugs of high energy—low voltage type (HE-LV).

HE-LV spark plugs, used in particular in gas turbines and jet engines, are of the type capable of providing a few tenths of a joule to several joules of energy under a voltage of 2 to 3 KV, whilst the actuating voltage of high energy—high voltage (HE-HV) spark plugs is of the order of 20 KV. HE-LV spark plugs contain a semi-conductive material between the electrodes (instead of an insulating material for HE-HV spark plugs), so that a sufficient voltage at the terminals of the electrodes leads firstly to the burn out of the semi-conductor, causing sufficient ionization to bring about the spark between the electrodes.

The advantages of the HE-LV spark plug, consisting in particular of its functioning not being very dependent on the conditions of the combustion chamber and necessitating a less significant firing chain, have led to the development of ceramic semi-conductors based on silicon carbide, described in particular in FR-A-2 269 789 and FR-A-2 346 881.

However, if LV devices are not generally used in engines, it is because the life of a semi-conductive plug becomes greatly reduced in cases of severe use, that is at high levels of pressure and temperature. Whilst for HV plugs it is the wear of the electrodes which determines the life, for LV plugs it is the wear of the semi-conductor, which intervenes before significant erosion of the electrodes. It was therefore desirable to improve the life of semi-conductors which can be used in HE-LV plugs.

The Applicant has established that it is especially in the commutation phase of the semi-conductor that the degradation of the material of which it is formed is produced, that is before the spark phase, and has succeeded in limiting the energy of pre-ionization of the material by the addition of heat-emitting elements. The Applicant has therefore perfected a semi-conductive ceramic composition having excellent discharge qualities and an improved life, which can be used in particular for spark plugs of gas turbines or jet engines.

Therefore a subject of the invention is a semi-conductive ceramic composition obtained from (a) a basic composition containing 40 to 80% by weight of a semi-conductor which is a silicon or boron carbide, 5 to 40% by weight of a binder or of a mixture of binders chosen from aluminum oxide, beryllium oxide, zirconium oxide, magnesium oxide, silica and silicon nitride, and 0 to 40% of a flux or a mixture of fluxes chosen from alkaline-earth carbonates and oxides, rare earth oxides and metal silicates, characterized by the addition of (b) 5 to 40% by weight, in relation to the basic composition (a), of a heat-emitting dope chosen from titanium, barium titanate, tungsten and lanthanum boride.

The binder is an insulating powder with a high melting point, constituting the support of the semi-conductor.

The flux, which is not indispensable in this composition and is used essentially to reduce the firing temperature, is advantageously a silicate or a mixture of silicates, in particular of magnesium and aluminum such as bentonite, kaolin, talc, etc., but also alkaline-earth carbonates such as dolomite, etc. In particular 10 to 30% by weight of flux(es) can be used in the basic composition (a).

The heat-emitting dope which is an essential component according to the invention is advantageously barium titanate or lanthanum boride ($LaB_6$) which, in addition to their strong emitting power, do not degrade the semi-conductor component.

The making up of the ceramic composition according to the invention—mixing, pressing and firing—is carried out in the traditional way according to the materials used.

The following examples illustrate the invention.

EXAMPLE 1

(a) Preparation of the ceramic composition.

A basis composition is prepared having the following formulation (% by weight):

| | |
|---|---|
| silicon carbide (2 to 35 $\mu$m) | 60 |
| bentonite | 5 |
| kaolin | 10 |
| talc | 5 |
| dolomite | 10 |
| aluminum oxide (3.5 to 4 $\mu$m) | 10 |

1 kg of this composition is mixed in a ball mixer for 2 hours. 65 g of water, then 100 g (10%) of barium titanate are added and the whole is mixed for half an hour. The mixture obtained is passed through a 630 $\mu$m sieve.

(b) Pressing and firing.

The ceramic composition obtained above is pressed at 300 bars (30 MPa) into cylinders 10.5 mm diameter and 30 mm high. The cylinders are placed in a ceramic mould, baked at 80° C. for 2 hours, then fired at 1630° C. for 27 hours.

EXAMPLE 2

The same formulation is used as in Example 1, except for the heat-emitting element, which is titanium powder (granulometry 13 $\mu$m) instead of lanthanum boride. After pressing the cylinders, firing is carried out at 1600° C. for 48 hours.

EXAMPLE 3

The operation is carried out exactly as in Example 1, but using lanthanum boride instead of barium titanate.

The semi-conductor ceramic cylinders thus obtained were machined, and mounted in plugs submitted to the following tests so as to determine their characteristics in comparison with plugs "A" of the same useful diameter, containing ceramic semi-conductors based on silicon carbide, which are known to have the best longevity. The tests were carried out under a voltage of 2 KV.

I. COMMUTATION ENERGY UNDER 30 BARS (3 MPa)

| | A | EXAMPLES 1 AND 3 |
|---|---|---|
| Energy (mJ) | 10–40 | 2–15 |
| Max current (A) | 15–35 | 1.5–15 |
| Delay (us) | 1–1.5 | 0.5–1.2 |

II. COMMUTATION ENERGY IN THE PRESENCE OF A DROP OF KEROSENE

|  | A | EXAMPLES 1 AND 3 |
| --- | --- | --- |
| Energy (mJ) | 150–500 | 100–200 |
| Max current (A) | 8–30 | 1–5 |
| Delay (us) | 7–35 | 30–90 |

This test is representative of a flooded plug.

III. SPEED OF EROSION (a) Drop by drop test (badly atomized fuel)

|  | A | EXAMPLES 1 AND 3 |
| --- | --- | --- |
| Number of sparks for 1 mm of depth of wear | 75 000 to 250 000 | 150 000 to 300 000 |

(b) Test under a pressure of 30 bars (3 MPa) at 500° C.

|  | A | EXAMPLES 1 AND 3 |
| --- | --- | --- |
| Number of sparks for 2.5 mm of depth of wear | 300 000 to 400 000 | 400 000 to 600 000 |

The results show that the behaviour of the material according to the invention and the electrical characteristics of the discharge remain excellent:
   for temperature (up to about 950° C.)
   for pressure 3 bars (3 MPa), and when the plug is in the presence of badly atomized fuel.

We claim:

1. In a semi-conductive ceramic composition obtained from a basic composition containing 40 to 80% by weight of a semi-conductor which is a silicon carbide or boron carbide, 5 to 40% by weight of a binder or of a mixure of binders selected from the group consisting essentially of aluminum oxide, beryllium oxide, zirconium oxide, magnesium oxide, silica and silicon nitride, and 0 to 40% of a flux or a mixture of fluxes selected from the group consisting essentially of alkaline-earth carbonates and oxides, rare earth oxides and metal silicates, the improvement wherein 5 to 40% by weight, relative to the basic composition, of a heat-emitting dope selected from the group consisting essentially of titanium, barium titanate, tungsten and lanthanum boride is added.

2. A ceramic composition according to claim 1, wherein the binder is aluminum oxide.

3. A ceramic composition according to claim 1, wherein the flux comprises a silicate or a mixture of silicates.

4. A ceramic composition according to claim 3, wherein that the silicates comprise bentonite, kaolin and talc.

5. A ceramic composition according to claim 1, wherein the flux or mixtures of fluxes represents 10 to 30% by weight of the basic composition.

6. A ceramic composition according to claim 1, wherein the heat-emitting dope is barium titanate.

7. A ceramic composition according to claim 1, wherein the heat-emitting dope is lanthanum boride ($LaB_6$).

* * * * *